(12) United States Patent
Condo et al.

(10) Patent No.: US 11,827,810 B2
(45) Date of Patent: *Nov. 28, 2023

(54) FLEXIBLE HARDCOAT (71) Applicant: 3M INNOVATIVE PROPERTIES COMPANY, St. Paul, MN (US)

(72) Inventors: Peter D. Condo, Lake Elmo, MN (US); David Scott Thompson, Bayport, MN (US); John J. Stradinger, Roseville, MN (US); Catherine A. Leatherdale, Woodbury, MN (US); Richard J. Pokorny, Maplewood, MN (US); Steven D. Solomonson, Shoreview, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/604,791

(22) PCT Filed: May 4, 2020

(86) PCT No.: PCT/IB2020/054199
§ 371 (c)(1),
(2) Date: Oct. 19, 2021

(87) PCT Pub. No.: WO2020/225701
PCT Pub. Date: Nov. 12, 2020

(65) Prior Publication Data
US 2022/0213332 A1 Jul. 7, 2022

Related U.S. Application Data (60) Provisional application No. 62/845,558, filed on May 9, 2019.

(51) Int. Cl.
| C08K 3/36 | (2006.01) |
| C08K 9/06 | (2006.01) |
| C08J 5/18 | (2006.01) |
| C08F 2/44 | (2006.01) |
| C08F 220/18 | (2006.01) |
| C08F 292/00 | (2006.01) |
| C09D 4/00 | (2006.01) |
| C09D 5/00 | (2006.01) |
| C09D 5/02 | (2006.01) |
| C09D 133/04 | (2006.01) |
| C09D 133/14 | (2006.01) |
| C09D 7/62 | (2018.01) |
| C09D 7/61 | (2018.01) |
| C09D 7/40 | (2018.01) |
| C08J 7/04 | (2020.01) |
| C08J 7/046 | (2020.01) |

(52) U.S. Cl.
CPC ............... *C09D 7/61* (2018.01); *C08J 7/046* (2020.01); *C08J 7/0427* (2020.01); *C09D 4/00* (2013.01); *C09D 7/62* (2018.01); *C09D 7/67* (2018.01); *C08J 2367/02* (2013.01); *C08J 2433/14* (2013.01)

(58) Field of Classification Search
None
See application file for complete search history.

(56) References Cited

U.S. PATENT DOCUMENTS

| 4,455,205 A | 6/1984 | Olson |
| 4,921,759 A | 5/1990 | Orain |
| 6,245,833 B1 | 6/2001 | Kang |
| 6,376,060 B1 | 4/2002 | Yoshihara |
| 6,376,590 B2 | 4/2002 | Kolb |
| 6,841,190 B2 | 1/2005 | Liu |
| 7,101,616 B2 | 9/2006 | Arney |
| 7,178,264 B2 | 2/2007 | Kim |
| 7,241,437 B2 | 7/2007 | Davidson |
| 7,427,438 B2 | 9/2008 | Jones |
| 7,491,441 B2 | 2/2009 | Pokorny |
| 8,343,622 B2 | 1/2013 | Liu |
| 9,016,858 B2 | 4/2015 | Zheng |
| 9,676,960 B2 | 6/2017 | Kim |
| 9,706,649 B2 | 7/2017 | Jung |
| 9,709,707 B2 | 7/2017 | Zheng |
| 9,780,318 B2 | 10/2017 | Johnson |
| 2006/0147177 A1 | 7/2006 | Jing |
| 2006/0148950 A1 | 7/2006 | Davidson |

(Continued)

FOREIGN PATENT DOCUMENTS

| JP | 2016-157110 | 9/2016 |
| KR | 10-2014-0024562 | 3/2014 |

(Continued)

OTHER PUBLICATIONS

International Search Report for PCT International Application No. PCT/IB2020/054199, dated Jul. 31, 2020, 4 pages.

(Continued)

*Primary Examiner* — Sheeba Ahmed
(74) *Attorney, Agent, or Firm* — Jeffrey M. Olofson (57) ABSTRACT

A hardcoat composition includes one or more multifunctional (meth)acrylate monomers, and a nanoparticle mixture dispersed within the one or more multifunctional (meth)acrylate monomers. The nanoparticle mixture includes a first population of semi-reactive nanoparticles having an average particle diameter in a range from 5 nm to 60 nm, and a second population of reactive nanoparticles having an average particle diameter in a range from 5 nm to 60 nm.

19 Claims, 1 Drawing Sheet

(56) References Cited

U.S. PATENT DOCUMENTS

| | | |
|---|---|---|
| 2009/0004478 A1 | 1/2009 | Baetzold |
| 2010/0003501 A1 | 1/2010 | Liu |
| 2012/0276369 A1 | 11/2012 | Jing |
| 2013/0035433 A1 | 2/2013 | Mechernich |
| 2013/0302594 A1 | 11/2013 | Sugiyama |
| 2015/0132583 A1 | 5/2015 | Pokorny |
| 2015/0330597 A2 | 11/2015 | Schaffer |
| 2016/0326383 A1 | 11/2016 | Pokorny |
| 2016/0343963 A1 | 11/2016 | Liu |
| 2016/0343969 A1 | 11/2016 | Zeng |
| 2017/0165950 A1 | 6/2017 | Leatherdale |
| 2017/0166750 A1 | 6/2017 | Pokorny |
| 2017/0170416 A1 | 6/2017 | Johnson |
| 2017/0179424 A1 | 6/2017 | Lee |
| 2017/0233591 A1 | 8/2017 | Sugiyama |

FOREIGN PATENT DOCUMENTS

| | | |
|---|---|---|
| KR | 10-2017-0103644 | 9/2017 |
| WO | WO 2006-102383 | 9/2006 |
| WO | WO 2009-029438 | 3/2009 |
| WO | WO 2014-092422 | 6/2014 |
| WO | WO 2015/108834 A1 * | 7/2015 |
| WO | WO 2016-028542 | 2/2016 |
| WO | WO 2016-036507 | 3/2016 |
| WO | WO 2016-208785 | 12/2016 |
| WO | WO 2016-208999 | 12/2016 |
| WO | WO 2017-214105 | 12/2017 |
| WO | WO 2018-005833 | 1/2018 |
| WO | WO 2019-111207 | 6/2019 |
| WO | WO 2020-225703 | 11/2020 |
| WO | WO 2020-225704 | 11/2020 |

OTHER PUBLICATIONS

International Search Report for PCT International Application No. PCT/IB2020/054201, dated Jul. 31, 2020, 4 pages.

International Search Report for PCT International Application No. PCT/IB2020/054202, dated Jul. 31, 2020, 4 pages.

* cited by examiner

*Fig. 3*

FLEXIBLE HARDCOAT

CROSS REFERENCE TO RELATED APPLICATIONS

This application is a national stage filing under 35 U.S.C. 371 of PCT/IB2020/054199, filed May 4, 2020, which claims the benefit of U.S. Provisional Application No. 62/845,558, filed May 9, 2019, the disclosures of which are incorporated by reference in their entireties herein.

BACKGROUND

Displays and electronic devices have evolved to be curved, bent, rolled, or folded and provide new user experiences. These device architectures may include flexible organic light emitting diodes (OLEDs), plastic liquid crystal displays (LCDs) and the like, for example.

In order to realize such flexible displays and protect elements in the displays, a flexible cover sheet or flexible window film replaces a conventional glass cover sheet. This flexible cover sheet has a number of design parameters such as; high visible light transmission, low haze, excellent scratch resistance and puncture resistance, in order to protect the elements included in the display devices. In some cases, the flexible cover sheet may also need to withstand thousands of folding events around a tight bend radius (about 5 mm or less) without showing visible damage. In other cases, the flexible cover sheet must be able to unfold without leaving a crease after being bent at elevated temperature and humidity.

A variety of hard coated plastic substrates have been explored. More exotic materials like hard-coated colorless transparent polyimide films have also been shown to have high hardness and good scratch resistance. However, many hard-coated films fail to withstand folding events around a tight bend radius without showing visible damage.

SUMMARY

The present disclosure relates to a flexible hardcoat or a flexible hardcoat article that protects a display window and survives flexing or folding tests. The flexible hardcoat or a flexible hardcoat article maintains optical properties of a display film while providing scratch resistance to the display.

In one aspect, a hardcoat composition includes one or more multifunctional (meth)acrylate monomers, and a nanoparticle mixture dispersed within the one or more multifunctional (meth)acrylate monomers. The nanoparticle mixture includes 75 to 99 wt % of a first population of semi-reactive nanoparticles and 25 to 1 wt % of a second population of reactive nanoparticles. The semi-reactive nanoparticles have a reactive functional group and a non-reactive functional group. The first population of semi-reactive nanoparticles have an average particle diameter in a range from 5 nm to 60 nm. The second population of reactive nanoparticles have an average particle diameter in a range from 5 nm to 60 nm.

In another aspect, a hardcoat composition includes one or more multifunctional (meth)acrylate monomers, and a nanoparticle mixture dispersed within the one or more multifunctional (meth)acrylate monomers. The nanoparticle mixture includes 75 to 99 wt % of a first population of semi-reactive nanoparticles and 25 to 1 wt % of a second population of reactive nanoparticles. The first population of semi-reactive nanoparticles have a non-reactive functional group formed by a non-reactive surface treatment with a compound having a general formula $R—SiR'_m(OR'')_{3-m}$, wherein R is methyl or ethyl, R' is a $(C_1-C_4)$alkyl, R'' is a $(C_1-C_4)$alkyl, m is an integer from 0 to 2. The first population of semi-reactive nanoparticles have a reactive functional group formed by a reactive surface treatment with a compound having a general formula $X'-L'-SiR'_m(OR'')_3$, wherein X' is a free-radically polymerizable group, L' is an $(C_1-C_{12})$alkylene, R' is a $(C_1-C_4)$alkyl, R'' is a $(C_1-C_4)$alkyl, m is an integer from 0 to 2. The first population of semi-reactive nanoparticles have an average particle diameter in a range from 5 nm to 60 nm. The second population of reactive nanoparticles have an average particle diameter in a range from 5 nm to 60 nm. The second population of non-reactive nanoparticles have a reactive surface treatment with a compound having a general formula $X'-L'—SiR'_m(OR'')_{3-m}$, wherein X' is a free-radically polymerizable group, L' is an $(C_1-C_{12})$alkylene, R' is a $(C_1-C_4)$alkyl, R'' is a $(C_1-C_4)$alkyl, m is an integer from 0 to 2.

In another aspect, a hardcoat includes a reaction product of the hardcoat composition described herein. This hardcoat may have a uniform thickness in a range from 1 to 10 micrometers, 1 to 7 micrometers, from 2 to 6 micrometers, or from 2.5 to 5 micrometers.

In a further aspect, a hardcoat film includes a substrate, and the hardcoat, described herein, disposed on the substrate. This hardcoat film may exhibit superior flexibility and abrasion resistance.

In another aspect, an article includes an optical display, a display film described herein, and an optical adhesive layer fixing the display film to the optical display. The hardcoat may be disposed directly on a glass layer of the optical display.

These and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings, in which.

DETAILED DESCRIPTION

In the following detailed description, reference is made to the accompanying drawings that form a part hereof, and in which are shown by way of illustration several specific embodiments. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure. Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open-ended sense, and generally mean "including, but not limited to". It will be understood that "consisting essentially of", "consisting of", and the like are subsumed in "comprising," and the like.

The terms "display film", "protective film", "cover sheet film", and "protective display film" are herein used interchangeably.

"Transparent substrate" or "transparent layer" refers to a substrate or layer that has a high light transmission (typically greater than 85%, or greater than 90%) over at least a portion of the surface of the substrate over at least a portion of the light spectrum with wavelengths of about 350 to about 1600 nanometers, including the visible light spectrum (wavelengths of about 380 to about 750 nanometers).

"Reactive nanoparticle" refers to an inorganic oxide nanoparticle, for example silica, which has been surface modified with an organic surface group (for example, in the case of silica, a reaction product of an organo trialkoxy silane with the surface of the silica particle), wherein the organic group of the silane presents a chemical moiety capable of chemical reaction with the matrix resins of the hardcoat.

"Non-reactive nanoparticle" refers to an inorganic oxide nanoparticle, for example silica, which has been surface modified with an organic surface group (for example, in the case of silica, a reaction product of an organo trialkoxy silane with the surface of the silica particle), wherein the organic group of the silane presents a chemical moiety which is not capable of chemical reaction with the matrix resins of the hardcoat.

"Semi-reactive nanoparticle" or "partially reactive nanoparticle" refers to an inorganic oxide nanoparticle, for example silica, which has been surface modified with more than one organic surface group (for example, in the case of silica, a reaction product of multiple organo trialkoxy silanes with the surface of the silica particle), wherein at least one of the organic moieties of the organosilanes presents a chemical moiety which is capable of chemical reaction with the matrix resins of the hardcoat (reactive functional group) and wherein at least one of the organic moieties of the organosilanes presents a chemical moiety which is not capable of chemical reaction with the matrix resins of the hardcoat (non-reactive functional group).

The present disclosure relates to a flexible hardcoat or a flexible hardcoat article that may protect a display and survive abrasion and folding tests. The flexible hardcoat maintains optical properties of a display film while providing superior flexibility and scratch resistance to a display. The hardcoat composition includes one or more multifunctional (meth)acrylate monomers, and a nanoparticle mixture dispersed within the one or more multifunctional (meth)acrylate monomers.

The nanoparticle mixture includes 75 to 99 wt % of a first population of semi-reactive nanoparticles and 25 to 1 wt % of a second population of reactive nanoparticles. The semi-reactive nanoparticles have a reactive functional group and a non-reactive functional group. The first population of semi-reactive nanoparticles have an average particle diameter in a range from 5 nm to 60 nm. The second population of reactive nanoparticles have an average particle diameter in a range from 5 nm to 60 nm.

An illustrative nanoparticle mixture includes 75 to 99 wt % of a first population of semi-reactive nanoparticles and 25% to 1% of a second population of non-reactive nanoparticles. The first population of semi-reactive nanoparticles have a non-reactive functional group formed by a non-reactive surface treatment with a compound having a general formula R—SiR'$_m$(OR")$_{3-m}$, wherein R is methyl or ethyl, R' is a ($C_1$-$C_4$)alkyl, R" is a ($C_1$-$C_4$)alkyl, m is an integer from 0 to 2. The first population of semi-reactive nanoparticles have a reactive functional group formed by a reactive surface treatment with a compound having a general formula X'-L'—SiR'$_m$(OR")$_{3-m}$, wherein X' is a free-radically polymerizable group, L' is an ($C_1$-$C_{12}$)alkylene, R' is a ($C_1$-$C_4$) alkyl, R" is a ($C_1$-$C_4$)alkyl, m is an integer from 0 to 2. The first population of semi-reactive nanoparticles have an average particle diameter in a range from 5 nm to 60 nm. The second population of reactive nanoparticles have an average particle diameter in a range from 5 nm to 60 nm. The second population of reactive nanoparticles have a reactive surface treatment with a compound having a general formula X'-L'-SiR'$_m$(OR")$_{3-m}$, wherein X' is a free-radically polymerizable group, L' is an ($C_1$-$C_{12}$)alkylene, R' is a ($C_1$-$C_4$)alkyl, R" is a ($C_1$-$C_4$)alkyl, m is an integer from 0 to 2.

The nanoparticle mixture includes 90 to 99 wt % of a first population of semi-reactive nanoparticles and 10 to 1 wt % of a second population of reactive nanoparticles. The semi-reactive nanoparticles have a reactive functional group and a non-reactive functional group. The first population of semi-reactive nanoparticles have an average particle diameter in a range from 5 nm to 60 nm. The second population of reactive nanoparticles have an average particle diameter in a range from 5 nm to 60 nm.

The nanoparticle mixture includes 95 to 99 wt % of a first population of semi-reactive nanoparticles and 5 to 1 wt % of a second population of reactive nanoparticles. The semi-reactive nanoparticles have a reactive functional group and a non-reactive functional group. The first population of semi-reactive nanoparticles have an average particle diameter in a range from 5 nm to 60 nm. The second population of reactive nanoparticles have an average particle diameter in a range from 5 nm to 60 nm.

The first population of semi-reactive nanoparticles may include 1 to 50 mol % reactive functional groups and 99 to 50 mol % non-reactive functional groups.

The first population of semi-reactive nanoparticles may include 1 to 25 mol % reactive functional groups and 99 to 75 mol % non-reactive functional groups.

The first population of semi-reactive nanoparticles may include 5 to 50 mol % reactive functional groups and 95 to 50 mol % non-reactive functional groups.

The first population of semi-reactive nanoparticles may include 5 to 30 mol % reactive functional groups and 95 to 70 mol % non-reactive functional groups.

The first population of semi-reactive nanoparticles may include 1 to 15 mol % reactive functional groups and 99 to 85 mol % non-reactive functional groups.

The first population of semi-reactive nanoparticles may include 1 to 10 mol % reactive functional groups and 99 to 90 mol % non-reactive functional groups.

The first population of semi-reactive nanoparticles may include 1 to 5 mol % reactive functional groups and 99 to 95 mol % non-reactive functional groups.

The reactive nanoparticles and semi-reactive nanoparticles may each have an average particle diameter in a range from 10 nm to 40 nm, or 10 nm to 30 nm. The hardcoat film may withstand a bend radius of 5 mm or less, or 4 mm or less, or 3 mm or less, or 2 mm or less, or even 1 mm or less (in tension or compression or in both tension and compression) without failure or visible defects, such as delamination, cracking, crazing, or haze. While the present disclosure is not so limited, an appreciation of various aspects of the disclosure will be gained through a discussion of the examples provided below.

The hardcoat composition includes one or more multifunctional (meth)acrylate monomers, and a nanoparticle mixture dispersed within the one or more multifunctional (meth)acrylate monomers. The nanoparticle mixture includes a first population of semi-reactive nanoparticles (that is, having a reactive functional group that may react with the multifunctional (meth)acrylate monomers and a non-reactive functional group that does not react with the multifunctional (meth)acrylate monomers) and a second population of reactive nanoparticles (that is, reactive with the multifunctional (meth)acrylate monomers). The semi-reactive nanoparticles and reactive nanoparticles may be inorganic oxide nanoparticles.

The hardcoat composition may be cured or reacted to form a hardcoat or hardcoat film. Curing may initiate a reaction with the reactive functional groups of the reactive and semi-reactive nanoparticles by forming bonds with the multifunctional (meth)acrylate monomers, and at the same time, curing may not initiate a reaction with the non-reactive functional groups of the semi-reactive nanoparticles with the multifunctional (meth)acrylate monomers.

Reducing the relative number of reactive versus semi-reactive nanoparticles surprisingly improve flexibility while maintaining abrasion resistance of a hardcoat or hardcoat film. In addition, utilizing a surface treatment compound for the non-reactive functionality of the semi-reactive nanoparticle having a short alkyl chain (for example, methyl or ethyl) terminal group appears to surprisingly improve flexibility while maintaining abrasion resistance and reducing curl of a hardcoat or hardcoat film.

The first population of semi-reactive nanoparticles and a second population of reactive nanoparticles may independently have an average particle diameter in a range from 5 nm to 60 nm, or 10 nm to 40 nm, or 10 nm to 30 nm. The first population of semi-reactive nanoparticles and a second population of reactive nanoparticles may have the same average particle diameter.

The nanoparticle mixture includes a greater number of semi-reactive nanoparticles as compared to reactive nanoparticles. The nanoparticle mixture may include 75 to 99 wt % of a first population of semi-reactive nanoparticles and 25 to 1 wt % of a second population of reactive nanoparticles. The nanoparticle mixture may include 90% to 99% of a first population of semi-reactive nanoparticles and 10 to 1 wt % of a second population of reactive nanoparticles. The nanoparticle mixture may include 95 to 99 wt % of a first population of semi-reactive nanoparticles and 5 to 1 wt % of a second population of reactive nanoparticles.

The first population of semi-reactive nanoparticles and a second population of reactive nanoparticles are surface modified inorganic oxide particles that add mechanical strength and durability to the hardcoat. These nanoparticles may be substantially spherical in shape and relatively uniform in size. These nanoparticles may have a substantially monodisperse size distribution. These inorganic oxide particles are typically non-aggregated (substantially discrete).

The total concentration of the nanoparticle mixture (inorganic oxide nanoparticles) may be at least 30, 40, or 50 wt % solids and generally no greater than 75 wt %, 70 wt %, or 60 wt %. The total concentration of the nanoparticle mixture (inorganic oxide nanoparticles) may be present in the hardcoat composition at a loading in a range from 30 to 68 wt % by weight total solids, or from 40 to 60 wt % by weight total solids, or from 50 to 60 wt % by weight total solids.

The average particle size of the inorganic oxide particles can be measured using transmission electron microscopy to count the number of inorganic oxide particles of a given diameter. The inorganic oxide particles can consist essentially of or consist of a single oxide such as silica, or can comprise a combination of oxides, or a core of an oxide of one type (or a core of a material other than a metal oxide) on which is deposited an oxide of another type. Silica is a common inorganic oxide particle utilized in hardcoat compositions. The inorganic oxide particles are often provided in the form of a sol containing a colloidal dispersion of inorganic oxide particles in liquid media. The sol can be prepared using a variety of techniques and in a variety of forms including hydrosols (where water serves as the liquid medium), organosols (where organic liquids so serve), and mixed sols (where the liquid medium contains both water and an organic liquid).

Aqueous colloidal silicas dispersions are commercially available from Nalco Chemical Co. (Naperville, IL) under the trade designation "Nalco Collodial Silicas" such as products 2326, 1130, 1030, 1140, 1034A, 1050, 1060, 2327, and DVSZN004; from Nissan Chemical America Corporation (Houston, TX) under the tradename Snowtex™ such as products ST-XS, ST-S, ST-30, ST-50, ST-20L, ST-XL, ST-NXS, ST-NS, ST-N, ST-N-40, ST-OXS, ST-OS, ST-O, ST-O-40, and ST-OL; and from Nyacol Nano Technologies, Inc. (Ashland, MA) such as NexSil™ 5, 6, 12, 20, 85-40, 20A, 20K-30, and 20NH4. Organic dispersions of colloidal silicas are commercially available from Nalco Chemical Co., such as product 1057; from Nissan Chemical such as products NPC-ST-30, MA-ST, MA-ST-M, IPA-ST, IPA-ST-L, EG-ST, MEK-ST-40, MEK-ST-L, and TOL-ST; and from Nyacol Nano Technologies such as DP5820 and DP5840.

It may be desirable to employ a mixture of inorganic oxide particle types to optimize an optical property, material property, or to lower the total composition cost.

As an alternative to or in combination with silica the hardcoat may comprise various high refractive index inorganic oxide nanoparticles. Such nanoparticles have a refractive index of at least 1.60, 1.65, 1.70, 1.75, 1.80, 1.85, 1.90, 1.95, 2.00 or higher. High refractive index inorganic oxide nanoparticles include for example zirconia ("$ZrO_2$"), titania ("$TiO_2$"), antimony oxides, alumina, tin oxides, alone or in combination. Mixed metal oxide may also be employed.

Zirconias for use in the high refractive index layer are available from Nalco Chemical Co. under the trade designation "Nalco OOSSOO8", Buhler AG Uzwil, Switzerland under the trade designation "Buhler zirconia Z-WO sol" and Nissan Chemical America Corporation under the trade name NanoUse ZR™. Zirconia nanoparticles can also be prepared such as described in U.S. Patent Publication No. 2006/0148950 and U.S. Pat. No. 6,376,590. A nanoparticle dispersion that comprises a mixture of tin oxide and zirconia covered by antimony oxide (refractive index of about 1.9) is commercially available from Nissan Chemical America Corporation under the trade designation "HX-05M5". A tin oxide nanoparticle dispersion (refractive index of about 2.0) is commercially available from Nissan Chemicals under the trade designation "CX-S401M". Zirconia nanoparticles can also be prepared such as described in U.S. Pat. Nos. 7,241,437 and 6,376,590.

In general, a surface treatment compound has a first end that will attach to the particle surface (covalently, ionically or through strong physisorption) and a second end that imparts compatibility of the particle with the resin and either reacts with the resin during curing (reactive and semi-reactive particles), or does not react with the resin during curing (non-reactive functional groups of the semi-reactive particles). Examples of surface treatment compounds include alcohols, amines, carboxylic acids, sulfonic acids, phosphonic acids, silanes and titanates. The preferred type of treatment agent is determined, in part, by the chemical nature of the inorganic oxide nanoparticle surface and whether the particle or functional group is semi-reactive or non-reactive.

Silanes are preferred for silica and other siliceous fillers. Silanes and carboxylic acids are preferred for metal oxides such as zirconia. The surface modification can be done either subsequent to mixing with the monomers or after mixing. It is preferred in the case of silanes to react the silanes with the nanoparticle surface before incorporation into the resin. The required amount of surface modifier is dependent upon several factors such as particle size, particle type, modifier molecular weight, and modifier type. In general, it is preferred that approximately a monolayer of modifier is attached to the surface of the particle. The attachment procedure or reaction conditions required also depend on the surface modifier used. For silanes it is preferred to surface treat at elevated temperatures under acidic or basic conditions for from 1-24 hr approximately. Surface treatment agents such as carboxylic acids may not require elevated temperatures or extended time.

The silane surface treatments comprise one or more alkoxy silane groups when added to the inorganic oxide (e.g. silica) dispersions. The alkoxy silane group(s) hydrolyze with water (present in the nanoparticle dispersion) to form Si—OH, (hydroxy groups). These SiOH groups then react with SiOH groups on the nano-silica surface to form silane surface treated nano-silica.

The inorganic oxide (e.g. silica) nanoparticles are separately or independently surface modified with a reactive surface treatment compound (see A174 in Examples) or a non-reactive surface treatment compound (see METHYL in Examples).

The first population of semi-reactive nanoparticles may be formed by combining nanoparticles (silica for example) with a reactive and nonreactive surface treatment compounds. The reactive surface treatment compound includes a free-radically polymerizable group, such as a meth(acryl) or vinyl. The free-radically polymerizable group copolymerizes with the free-radically polymerizable (e.g. (meth)acrylate) monomers of the hardcoat composition.

Useful reactive surface treatment compounds include: (meth)acryl organosilanes for example (meth)acryloyl alkoxy silanes such as 3-(methacryloyloxy)propyltrimethoxysilane, 3-acryloylxypropyltrimethoxysilane, 3-(methacryloyloxy)propylmethyldimethoxysilane, 3-(acryloyloxypropyl)methyl dimethoxysilane, 3-(methacryloyloxy)propyldimethylmethoxysilane, and 3-(acryloyloxypropyl) dimethylmethoxysilane. In some embodiments, the (meth)acryl organosilanes can be favored over the acryl silanes. Suitable vinyl silanes include vinyldimethylethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltrisisobutoxysilane, vinyltriisopropenoxysilane, vinyltris(2-methoxyethoxy)silane. Suitable amino organosilanes are described for example in US2006/0147177; incorporated herein by reference.

The reactive (silane) surface treatment compound may have the general formula:

$$X'\text{-}L'\text{--}SiR'_m(OR'')_{3-m},$$

wherein X' is a free-radically polymerizable group,
L' is an $(C_1\text{-}C_{12})$alkylene,
R' is a $(C_1\text{-}C_4)$alkyl,
R" is a $(C_1\text{-}C_4)$alkyl, and
m is an integer from 0 to 2.

The reactive surface treatment compound may have a formula $X'\text{-}L'\text{-}SiR'_m(OR'')_{3-m}$, wherein X' is a (meth)acryl or vinyl group, L' is an $(C_3)$alkylene, m is 0, and R" is a $(C_1)$alkyl (as illustrated in the Examples as A174).

Useful non-reactive surface treatment compounds include silane compounds that lack a free-free-radically polymerizable group, such as (meth)acryl or vinyl group. The non-reactive nanoparticle and semi-reactive nanoparticle may have a non-reactive surface treatment with a compound having a general formula:

$$R\text{--}SiR'_m(OR'')_{3-m},$$

wherein R is methyl or ethyl,
R' is a $(C_1\text{-}C_4)$alkyl,
R" is a $(C_1\text{-}C_4)$alkyl, and
m is an integer from 0 to 2.

The non-reactive surface treatment compound may have a formula $R\text{--}SiR'_m(OR'')_{3-m}$, wherein R is methyl, R' is a $(C_1\text{-}C_2)$alkyl, R" is a $(C_1\text{-}C_2)$alkyl, and m is an integer from 0 to 2. The non-reactive surface treatment compound may have a formula $R\text{--}SiR'_m(OR'')_{3-m}$, wherein R is methyl, m is 0, and R" is a methyl (as illustrated in the Examples as METHYL).

An illustrative hardcoat composition includes one or more multifunctional (meth)acrylate monomers, and a nanoparticle mixture dispersed within the one or more multifunctional (meth)acrylate monomers. The nanoparticle mixture includes 75% to 99% of a first population of semi-reactive nanoparticles and from 25 to 1 wt % of a second population of reactive nanoparticles. The first population of semi-reactive nanoparticles have 5 to 50 mol % reactive functional groups and 95 to 50 mol % non-reactive functional groups. The first population of semi-reactive nanoparticles have an average particle diameter in a range from 5 nm to 60 nm and the second population of reactive nanoparticles have an average particle diameter in a range from 5 nm to 60 nm.

The resin matrix forming the hardcoat may be formed of one or more (meth)acrylate monomers. The term "monomers" refers to oligomers or monomers.

The polymerizable resin composition includes at least one first (meth)acrylate monomer comprising at least three

(meth)acrylate groups and alkoxy (i.e. alkylene oxide) repeat units. The alkoxy (i.e. alkylene oxide) repeat units typically have the formula—[O-L]—wherein L is a linear or branched alkylene. In some embodiments, the alkylene is a linear or branched $C_2$-$C_6$ alkylene.

In some embodiments, the first (meth)acrylate monomer includes linear alkoxy repeat units such as ethylene oxide repeat units. Such monomers may be represented by the general formula:

wherein R is an organic residue having a valency of p, n is the number of carbon atoms of the alkoxy repeat unit, m is the number of alkoxy repeat units, $R^6$ is hydrogen or methyl, and p is at least 3. For each m, n can independently range from 1 to 4. In some embodiments, the number of alkoxy repeat units, m, is greater than 6 and typically less than 20. In some embodiments, p is at least 4, or 5, or 6. In some embodiments, R is a hydrocarbon residue, optionally further comprising one or more oxygen, sulfur or nitrogen atoms. In some embodiments, R comprises at least 3, 4, 5, or 6 carbon atoms and typically no greater than 12 carbon atoms.

In other embodiments, the first (meth)acrylate monomer includes branched alkoxy repeat units such as isopropylene oxide and/or isobutylene oxide repeat units. Some embodied monomers may be represented by the general formula:

wherein R and p are the same a previously described. In the case of branched isopropylene oxide repeat units, n is 2 and q is 1. In the case of branched isobutylene oxide repeat units, n is 2 and q is 2.

The first (meth)acrylate monomer includes at least three (meth)acrylate groups and $C_2$-$C_4$ alkoxy repeat units may comprises any combination of linear and/or branched $C_2$-$C_4$ alkoxy repeat units. Thus, the first (meth)acrylate monomer may comprise solely ethylene oxide repeat units, solely propylene oxide repeat units, solely butylene oxide repeat units, as well as combinations thereof. In one embodiment, the first (meth)acrylate monomer comprises a combination of both ethylene oxide and propylene oxide repeat units.

In some embodiments, the molecular weight of the first (meth)acrylate monomer divided by the number of (meth) acrylate groups ranges from about 220 to 375 g/mole. Or in other words, the molecular weight per (meth)acrylate group ranges from about 220 to 375 g/mole per (meth)acrylate. As is demonstrated in the forthcoming examples, inclusion of such first (meth)acrylate monomer is amenable to providing a hardcoat that is both flexible and abrasion resistant. In some embodiments, the cured hardcoat (at a thickness of at least 2.5 micrometers) exhibits no cracking when tested with a #4H pencil and a 1 kilogram load. Alternatively or in addition thereof, the cured hardcoat is sufficiently durable such that it exhibits No Scratch (NS) or Slight Scratch (SS) after abrasion testing (according to the test method described in the examples). No Scratch (NS) or Slight Scratch (SS) following abrasion testing gives films that have measured haze (or a measured increase in haze) of less than 5%, preferably less than 4%, more preferably less than 3% or less than 2% or less than 1%.

Commercially available ethoxylated trimethylolpropane triacrylate monomers that meet such criteria include for example SR9035, and SR502, available from Sartomer Arkema Group (Exton, PA). Other monomers that meet such criteria can be synthesized, such as by reaction of polyalkylene oxide polyols with acrylic acid.

The concentration of the first (meth)acrylate monomer in the cured hardcoat composition is typically at least 5 wt-% and in some embodiments is at least 10 wt-% solids and generally no greater than 40 wt-%, or 35 wt-%, or 30 wt-%, or 25 wt-% solids. In some embodiments, the concentration of the first monomer is at least 11, 12, 13, 14, or 15 wt-% solids. In some embodiments, the concentration of the first monomer ranges from 5 to 10 wt-% solids. As used herein wt-% solids refers to the total amount of the dried and/or cured hardcoat composition after volatilization of any solvent that may be present.

The polymerizable resin of the hardcoat composition comprises at least one second multifunctional (meth)acrylate monomer. The second (meth)acrylate monomer is a different monomer than the first monomer.

Useful multifunctional (meth)acrylate monomers and oligomers include:

(a) di(meth)acryl containing monomers such as 1,3-butylene glycol diacrylate, 1,4-butanediol diacrylate, 1,6-hexanediol diacrylate, 1,6-hexanediol monoacrylate monomethacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, caprolactone modified neopentylglycol hydroxypivalate diacrylate, caprolactone modified neopentylglycol hydroxypivalate diacrylate, cyclohexanedimethanol diacrylate, diethylene glycol diacrylate, dipropylene glycol diacrylate, ethoxylated bisphenol A diacrylate, hydroxypivalaldehyde modified trimethylolpropane diacrylate, neopentyl glycol diacrylate, polyethylene glycol diacrylate (e.g., SR344 from Sartomer Arkema Group (Exton, PA)), propoxylated neopentyl glycol diacrylate, tetraethylene glycol diacrylate, tricyclodecanedimethanol diacrylate, triethylene glycol diacrylate, tripropylene glycol diacrylate;

(b) tri(meth)acryl containing monomers such as glycerol triacrylate, trimethylolpropane triacrylate, ethoxylated triacrylates (such as, ethoxylated trimethylolpropane triacrylate (e.g., SR9035 from Sartomer Arkema Group (Exton, PA)), propoxylated triacrylates (e.g., propoxylated glyceryl triacrylate, propoxylated trimethylolpropane triacrylate), trimethylolpropane triacrylate, tris(2-hydroxyethyl)isocyanurate triacrylate;

(c) higher functionality (meth)acryl containing monomer such as ditrimethylolpropane tetraacrylate, dipentaerythritol pentaacrylate, pentaerythritol triacrylate, ethoxylated pentaerythritol tetraacrylate, and caprolactone modified dipentaerythritol hexaacrylate.

Oligomeric (meth)acryl monomers such as, for example, polyester acrylates, and epoxy acrylates may also be employed.

Such (meth)acrylate monomers are widely available from vendors such as, for example, Sartomer Arkema Group (Exton, PA); Allnex (Alpharetta, GA); and Aldrich Chemical Company (Milwaukee, WI).

In some embodiments, the hardcoat composition comprises a second (meth)acrylate monomer comprising at least three (meth)acrylate functional groups. In some embodiments, the second monomer comprises at least four, five or six (meth)acrylate functional groups. Acrylate functional groups tend to be favored over (meth)acrylate functional groups.

Preferred commercially available second (meth)acrylate monomers include for example trimethylolpropane triacrylate (e.g. SR351 from Sartomer Arkema Group, (Exton, PA)), ethoxylated trimethylolpropane triacrylate (e.g. SR454 from Sartomer Arkema Group, (Exton, PA)), mixture of pentaerythritol tetraacrylate, and pentaerythritol triacrylate (e.g. SR444c from Sartomer Arkema Group), dipentaerythritol pentaacrylate (e.g. SR399 from Sartomer Arkema Group), mixture of ethoxylated pentaerythritol tetraacrylate and ethoxylated pentaerythritol triacrylate (e.g. SR494 from Sartomer Arkema Group), dipentaerythritol hexaacrylate, and tris(2-hydroxy ethyl) isocyanurate triacrylate (e.g. SR368 from Sartomer Arkema Group).

In some embodiments, the second monomer does not comprise $C_2$-$C_4$ alkoxy repeat units.

The concentration of the total amount of second monomer(s) in the cured hardcoat composition is typically at least 5 wt-% or 10 wt-% solids and generally no greater than 40, 35 or 30 wt-% solids. In some embodiments, the total amount of second monomer(s) ranges from 10 to 25 wt-% solids. In other embodiments, the total amount of second monomer(s) ranges from 5 to 15 wt-% solids.

In other embodiments, the hardcoat composition may comprise a blend of two or more monomers comprising at least three (meth)acrylate functional groups and at least one di(meth)acrylate monomer or oligomer. The concentration of the di(meth)acrylate monomer or oligomer is typically no greater than 15, or 10, or 5 wt-% solids of the total hardcoat composition.

Urethanes are typically added to hardcoat compositions to increase flexibility of the cured hardcoat. However, adding urethanes, for example multifunctional acrylate urethane oligomers, decreases abrasion resistance of the cured hardcoat. Hardcoat compositions and cured hardcoats described herein are substantially free of urethane. The hardcoat composition may contain less than 5 wt %, or less than 3 wt %, or less than 2 wt %, or less than 1 wt %, urethane. The one or more multifunctional (meth)acrylate monomers form at least 95 wt %, or at least 97 wt %, or at least 98 wt % of monomers in the hardcoat composition. At least 95 wt %, or at least 97 wt %, or at least 98 wt % of monomers in the hardcoat composition are formed from (meth)acrylate monomers. The term "monomers" is assumed to include the term "oligomers" herein.

Hardcoats or hardcoat films may be formed by curing (polymerizing) the hardcoat compositions described herein. The hardcoats described herein are the reaction product of the hardcoat compositions described herein. To facilitate curing of the hardcoat, polymerizable compositions described herein may further comprise at least one free-radical thermal initiator and/or photoinitiator. When such an initiator and/or photoinitiator is present, it comprises less than about 5 percent by weight, more typically less than about 2 percent (by weight total solids) of the polymerizable composition, based on the total weight of the polymerizable composition. Free-radical curing techniques are well known in the art and include, for example, thermal curing methods as well as radiation curing methods such as electron beam or ultraviolet radiation. Useful free-radical photoinitiators include, for example, those known as useful in the UV cure of acrylate polymers such as described in WO2006/102383.

The hardcoat composition may optionally comprise various additives. For example, silicone or fluorinated additive may be added to lower the surface energy of the hardcoat. In one embodiment, the hardcoat coating composition further comprises one or more perfluoropolyether urethane additives, such as described in U.S. Pat. No. 7,178,264. The total amount of perfluoropolyether urethane additives alone or in combination with other fluorinated additives typically ranges from to 0.05% to 1 wt-% solids.

Certain silicone additives have also been found to provide ink repellency in combination with low lint attraction, as described in WO 2009/029438; incorporated herein by reference. Such silicone (meth)acrylate additives generally comprise a polydimethylsiloxane (PDMS) backbone and at least one alkoxy side chain terminating with a (meth)acrylate group. The alkoxy side chain may optionally comprise at least one hydroxyl substituent. Such silicone (meth)acrylate additives are commercially available from various suppliers such as Tego Chemie (Essen, Germany) under the trade designations "TEGO Rad 2250", "TEGO Rad 2300", "TEGO Rad 2500", and "TEGO Rad 2700". Of these, "TEGO Rad 2100" provided the lowest lint attraction.

The hardcoat composition can be applied as a single or as multiple layers to a substrate using conventional film application techniques. Thin films can be applied using a variety of techniques, including dip coating, forward and reverse roll coating, wire wound rod coating, and die coating. Die coaters include knife coaters, slot coaters, slide coaters, fluid bearing coaters, slide curtain coaters, drop die curtain coaters, and extrusion coaters among others. Many types of die coaters are described in the literature. Although it is usually convenient for the substrate to be in the form of a roll of continuous web, the coatings may be applied to individual sheets.

The hardcoat composition may be dried in an oven to remove the solvent and then cured for example by exposure to ultraviolet radiation using an H-bulb or other lamp at a desired wavelength, preferably in an inert atmosphere (less than 50 parts per million oxygen). The reaction mechanism causes the free-radically polymerizable materials to crosslink.

The hardcoat (cured) may have a uniform thickness in a range from 1 to 10 micrometers, 1 to 7 micrometers, from 2 to 6 micrometers, or from 2.5 to 5 micrometers.

A hardcoat film includes a substrate, and the hardcoat, as described herein, disposed on the substrate. The substrate may be transparent to visible light.

The substrate or transparent substrate layer may have a yield stress value greater than 70 MPa, or greater than 90 MPa, or greater than 120 MPa, or greater than 160 MPa. The phrase "yield stress" or "offset yield stress" refers herein to "0.2% offset yield strength" as defined in ASTM D638-14. ASTM D638-14 section A2.6 defines the test method for "offset yield strength" and is defined as the stress at which the strain exceeds by a specified amount (the offset) an extension of the initial proportional portion of the stress-strain curve. It is expressed in force per unit area, usually megapascals (pounds force per square inch).

The transparent substrate layer may be formed of any useful polymeric material that provides the desired mechanical properties (such as dimensional stability) and optical properties (such as light transmission and clarity) to the display film. Examples of materials suitable for use in the substrate layer include polyacrylate, polymethylmethacrylate, polycarbonate, polyamides, polyimide, polyesters such as poly(ethylene terephthalate) (PET), or poly(ethylene naphthalate) (PEN), polycyclic olefin polymers (COP), thermoplastic polyurethanes, or tri-acetyl cellulose (TAC). The transparent substrate layer may be a multilayer optical film having a plurality of alternating layers of polymeric materials (such as PETs or PENs) cooperating to reflect or transmit light.

One useful polymeric material for forming the transparent polymeric substrate layer is polyimide. In many embodiments the polyimide substrate layer is colorless. Colorless polyimide can be formed via chemistry or via nanoparticle incorporation. Some exemplary colorless polyimides formed via chemistry are described in WO 2014/092422.

In an embodiment, a multilayer film may include peelable, strippable, or sacrificial layers wherein the outer cured hardcoat film once removed is on an alternate substrate. The multilayer substrate may be coextruded wherein the removed hardcoat film has a particularly thin substrate (e.g. less than or equal to about 13 micrometers); a substrate that possesses adhesive properties; and/or a substrate that is particularly smooth and debris-free and as such is more amenable to coating of conductive or barrier layers.

The transparent substrate may be a transparent thermoplastic substrate having a uniform thickness in a range from about 20 to about 350 micrometers, or from about 20 to about 150 micrometers, or about 20 to about 100 micrometers. The hardcoat film may have a total overall uniform thickness in a range from about 25 to about 360 micrometers, or from about 25 to about 160 micrometers, or from about 25 to 110 micrometers. In some embodiments, the hardcoat film has a total overall uniform thickness in a range from about 20 to about 160 micrometers, or from about 20 to about 110 micrometers, or from about 20 to 80 micrometers.

The transparent substrate layer may be primed or treated to impart some desired property to one or more of its surfaces. In particular the transparent substrate layer can be primed to improve adhesion of the hardcoat with the transparent substrate layer. Examples of such treatments include corona, flame, plasma and chemical treatments such as, acrylate or silane treatments.

Abrasion is a method of wearing down or rubbing away material by means of friction. The abrasion resistance of a material helps it to withstand mechanical action and tends to protect the removal of materials from its surface. This allows the material to retain its integrity and hold its form. Abrasion resistance can be measured by rubbing or wiping the hardcoat film for a specified number of cycles with a rough material such as steel wool or a scouring pad and then inspecting the layer for visible changes such as fine scratches or haze.

In one embodiment, the hardcoat film includes the hardcoat layer (having a thickness is a range from 1 to 10 micrometers) disposed on a transparent polymeric or thermoplastic substrate layer (having a thickness in a range from 20 to 100 micrometers).

The hardcoat film may have a haze value of 4% or less, or 2% or less, or 1% or less, or 0.5% or less. In some embodiments the hardcoat film may have a haze value of 5% or less. The hardcoat film may have a clarity of 98% or greater, or 99% or greater. The hardcoat film may have a visible light transmission of 85% or greater, or 87% or greater, or 90% or greater, or 93% or greater.

The hardcoat film may have a yellow index or b* value of 5 or less, or 4 or less, or 3 or less, or 2 or less, or 1 or less. In many embodiments the display film may have a yellow index or b* value of 1 or less.

The hardcoat film may maintain a haze value of 2% or less, or 1.5% or less, or 1% or less after at least 500, 1,000, 5,000, 10,000, 100,000 or 200,000 bending or folding cycles about a 3 mm radius. The hardcoat film may maintain a stable haze value, or remain intact without cracking crazing, or delaminating, after at least 500, 1,000, 5,000, 10,000, 100,000 or 200,000 bending or folding cycles about a 5 mm radius, or about a 4 mm radius, or about a 3 mm radius, or about a 2 mm radius, or about a 1 mm radius. The hardcoat film may remain intact after at least 500, 1,000, 5,000, 10,000, 100,000 or 200,000 bending or folding cycles about a 4 mm radius or less, in tension or compression.

Figure 1:
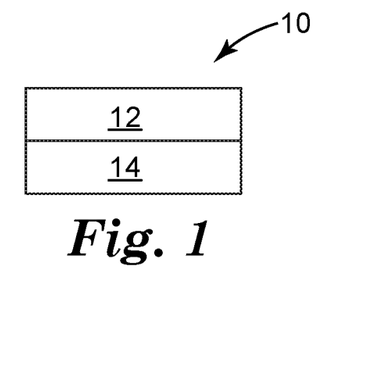
FIG. 1 is a schematic diagram side elevation view of an illustrative flexible hardcoat or a flexible hardcoat article.

FIG. 1 is a schematic diagram side elevation view of an illustrative hardcoat film 10.

Figure 2:
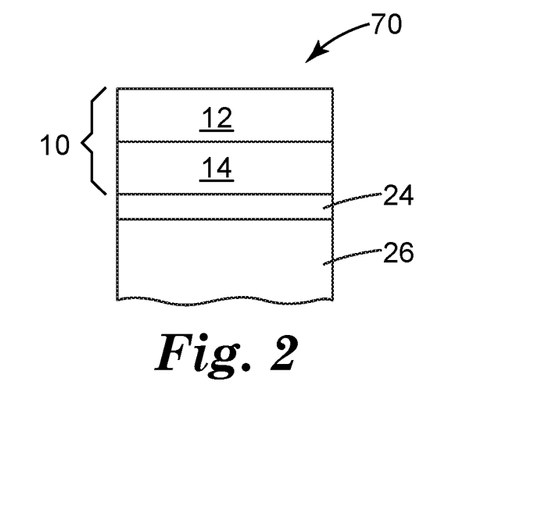
FIG. 2 is a schematic diagram side elevation view of an illustrative flexible hardcoat or a flexible hardcoat article on an optical display forming an article.

FIG. 2 is a schematic diagram side elevation view of an illustrative flexible hardcoat or a flexible hardcoat film 10 on an optical display 26 forming an article 70.

Figure 3:
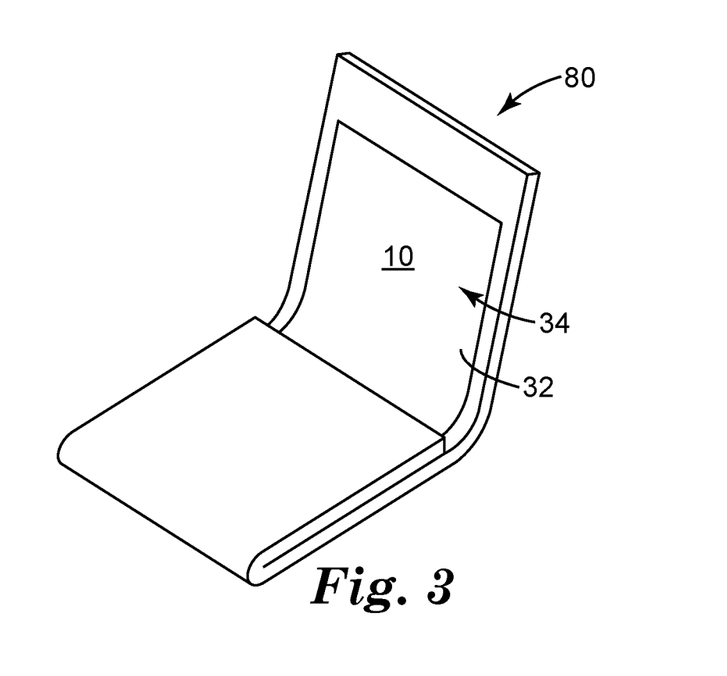
FIG. 3 is a schematic diagram perspective view of an illustrative folding article including an illustrative flexible hardcoat or a flexible hardcoat article.

FIG. 3 is a schematic diagram perspective view of an illustrative folding article 80 including an illustrative flexible hardcoat or a flexible hardcoat film 10.

A hardcoat film 10 includes a transparent substrate 14, and the hardcoat 12, described herein, disposed on the transparent substrate 14. This hardcoat film 10 may exhibit superior flexibility and abrasion resistance.

An optical display 70 includes a hardcoat film 10 described herein, and an optical adhesive layer 24 fixing the hardcoat film 10 to the optical display 26. The hardcoat 12 may form an outer surface of the optical display 34.

The hardcoat film 10 may be disposed on an optical element such as an optical display 34 to form a display device 80. The display device 80 may fold onto itself, so that the portions of the hardcoat film 10 contacts each other, as illustrated in FIG. 3. The display device 80 may not be a folding article and may only flex within a certain range, or may be a static curved display device.

An optical display 34 may form at least a portion of the display device. The display device 80 may include a display window 32. The display device 80 can be any useful article such as a phone or smartphone, electronic tablet, electronic notebook, computer, and the like. The optical display may include an organic light emitting diode (OLED) display panel. The optical display may include a liquid crystal display (LCD) panel or a reflective display. Examples of reflective displays include electrophoretic displays, electrofluidic displays (such as an electrowetting display), interferometric displays or electronic paper display panels, and are described in US 2015/0330597.

The hardcoat film 10 and the optical display 34 may be flexible or bendable or foldable so that a portion of the hardcoat film 10 and the optical display 34 can articulate relative to another portion of the hardcoat film 10 and optical display 34 to form a bend radius of 3 mm or less in the hardcoat film 10 at the bend or fold line. The hardcoat film 10 and the optical display 34 may be flexible or bendable or foldable so that a portion of the hardcoat film 10 and optical display 34 can articulate relative to another portion of the hardcoat film 10 and the optical display 34 to form a bend radius such that the hardcoat film 10 overlaps itself and is separated from each other by a distance on 10 mm or less, or 6 mm or less or 3 mm or less or contacts each other.

Objects and advantages of this disclosure are further illustrated by the following examples, but the particular materials and amounts thereof recited in these examples, as well as other conditions and details, should not be construed to unduly limit this disclosure.

EXAMPLES

The Examples of this invention illustrate a novel, effective strategy to produce hardcoats that are both flexible and abrasion resistant. The hardcoat compositions of the Examples are based on blends of semi-reactive and reactive nanoparticles. The semi-reactive nanoparticles are exemplified with nanoparticles that possess both a reactive (e.g. A174 (acrylate)) and non-reactive (e.g. methyl) functionality. The reactive nanoparticles are exemplified using reactive (e.g. A174 (acrylate)) functionality. The Examples show an increase in hardcoat flexibility with a decrease in nanoparticle reactivity. Furthermore, the Examples maintain good abrasion resistance despite the decrease in nanoparticle reactivity. Current art on hardcoats for rigid (non-flexible) surfaces focuses on reactive nanoparticles to achieve good abrasion resistance. Comparative Examples are included to illustrate strategies from the art to incorporate flexibility into hardcoats. The Comparative Examples illustrate the use a combination of strategies including the common use of a urethane acrylate in the hardcoat composition. The Comparative Examples also illustrate the use of larger nanoparticles that are inherently less reactive. The Comparative Examples do exhibit flexibility, but at the expense of sacrificing abrasion resistance. Hardcoats for the emerging flexible OLED display market must possess both flexibility and abrasion resistance.

TABLE 1

Materials

| Material | Description | Supplier |
| --- | --- | --- |
| NALCO 2327 | 20 nm colloidal SiO2 aqueous dispersion | Nalco Co. (Naperville, IL) |
| NALCO 2329K | 75 nm colloidal SiO2 aqueous dispersion | Nalco Co. |
| A174 | 3-(trimethoxysilyl)propyl methacrylate | Gelest, Inc.(Morrisville, PA) |
| METHYL-TMOS | methyltrimethoxysilane | Gelest, Inc. |
| CYANO-TMOS | 3-cyanopropyltrimethoxysilane | Gelest, Inc. |
| PHENYL-TMOS | phenyltrimethoxysilane | Gelest, Inc. |
| iC8-TMOS | isooctyltrimethoxysilane | Gelest, Inc. |
| SR344 | polyethylene glycol 400 diacrylate | Sartomer Arkema Group (Exton, PA) |
| SR399 | dipentaerythritolpentaacrylate | Sartomer Arkema Group |
| SR444c | pentaerythritol triacrylate and pentaerythritol tetraacrylate mixture | Sartomer Arkema Group |
| SR9035 | ethoxylated trimethylolpropane triacrylate | Sartomer Arkema Group |
| E8701 | EBECRYL 8701, aliphatic urethane triacrylate | Allnex (Alpharetta, GA) |
| CN981B88 | aliphatic urethane diacrylate oligomer and hexandiol diacrylate monomer mixture | Sartomer Arkema Group |
| ESACURE 1 | photoinitiator | IGM Resins USA Inc. (St. Charles, IL) |
| PM-1501 | wood protector | 3M Company (St. Paul, MN) |
| PM | 1-methoxy-2-propanol | Alfa Aesar (Ward Hill, MA) |
| MEK | methylethylketone | OmniSolv (Billerica, MA) |
| PET | primed polyester film | 3M Company |

Surface Modified SiO$_2$ Nanodispersions

SiO$_2$ Nanodispersion: A174 20 nm: 400 grams of NALCO 2327 was placed in a 32 ounce glass jar. Agitation was initiated and 450 grams of PM was slowly added. 22.01 grams of A174 was slowly added. The nanodispersion was agitated for an additional 20 minutes. The nanodispersion was placed in an oven for 24 hours at 80° C. to modify the nanoparticle surface with the reactive acrylate functionality from the silane. The nanodispersion was cooled to room temperature. 330 grams of PM was added to the nanodispersion. A solvent exchange was performed to remove water using rotary evaporation (Buchi, New Castle, DE) under vacuum at 64° C. The final nanoparticle content of the nanodispersion was adjusted to 45 w %.

SiO$_2$ Nanodispersion: A174/METHYL 20 nm: 400 grams of NALCO 2327 was placed in a 32 ounce glass jar. Agitation was initiated and 450 grams of PM was slowly added. 2.20 grams of A174 was slowly added. 10.56 grams of METHYL-TMOS was slowly added. The nanodispersion was agitated for an additional 20 minutes. The nanodispersion was placed in an oven for 24 hours at 80° C. to modify the nanoparticle surface with the reactive acrylate and non-reactive methyl functionality from the silanes. The nanodispersion was cooled to room temperature. 330 grams of PM was added to the nanodispersion. A solvent exchange was performed to remove water using rotary evaporation (Buchi, New Castle, DE) under vacuum at 64° C. The final nanoparticle content of the nanodispersion was adjusted to 45 w %.

SiO$_2$ Nanodispersion: METHYL 20 nm: 400 grams of NALCO 2327 was placed in a 32 ounce glass jar. Agitation was initiated and 450 grams of PM was slowly added. 12.07 grams of METHYL-TMOS was slowly added. The nanodispersion was agitated for an additional 20 minutes. The nanodispersion was placed in an oven for 24 hours at 80° C. to modify the nanoparticle surface with the non-reactive methyl functionality from the silane. The nanodispersion was cooled to room temperature. 330 grams of PM was added to the nanodispersion. A solvent exchange was performed to remove water using rotary evaporation (Buchi, New Castle, DE) under vacuum at 64° C. The final nanoparticle content of the nanodispersion was adjusted to 45 w %.

SiO$_2$ Nanodispersion: A174/CYANO 20 nm: 400 grams of NALCO 2327 was placed in a 32 ounce glass jar. Agitation was initiated and 450 grams of PM was slowly added. 11.00 grams of A174 was slowly added. 8.39 grams of CYANO-TMOS was slowly added. The nanodispersion was agitated for an additional 20 minutes. The nanodispersion was placed in an oven for 24 hours at 80° C. to modify the nanoparticle surface with the reactive acrylate and non-reactive cyano functionality from the silanes. 330 grams of PM was added to the nanodispersion. The nanodispersion was cooled to room temperature. A solvent exchange was performed to remove water using rotary evaporation (Buchi, New Castle, DE) under vacuum at 64° C. The final nanoparticle content of the nanodispersion was adjusted to 45 w %.

SiO₂ Nanodispersion: A174 75 nm: 400 grams of NALCO 2329K was placed in a 32 ounce glass jar. Agitation was initiated and 450 grams of PM was slowly added. 6.92 grams of A174 was slowly added. The nanodispersion was agitated for an additional 20 minutes. The nanodispersion was placed in an oven for 24 hours at 80° C. to modify the nanoparticle surface with the reactive acrylate functionality from the silane. The nanodispersion was cooled to room temperature. 330 grams of PM was added to the nanodispersion. A solvent exchange was performed to remove water using rotary evaporation (Buchi, New Castle, DE) under vacuum at 64° C. The final nanoparticle content of the nanodispersion was adjusted to 45 w %.

SiO₂ Nanodispersion: A174/PHENYL 75 nm: 400 grams of NALCO 2329K was placed in a 32 ounce glass jar. Agitation was initiated and 450 grams of PM was slowly added. 4.64 grams of A174 was slowly added. 1.82 grams of PHENYL-TMOS was slowly added. The nanodispersion was agitated for an additional 20 minutes. The nanodispersion was placed in an oven for 24 hours at 80° C. to modify the nanoparticle surface with the reactive acrylate and non-reactive phenyl functionality from the silanes. The nanodispersion was cooled to room temperature. 330 grams of PM was added to the functionalized nanodispersion. A solvent exchange was performed to remove water using rotary evaporation (Buchi, New Castle, DE) under vacuum at 64° C. The final nanoparticle content of the nanodispersion was adjusted to 45 w %.

SiO₂ Nanodispersion: A174/iC8 75 nm: 400 grams of NALCO 2329K was placed in a 32 ounce glass jar. Agitation was initiated and 450 grams of PM was slowly added. 4.64 grams of A174 was slowly added. 2.16 grams of iC8-TMOS was slowly added. The nanodispersion was agitated for an additional 20 minutes. The nanodispersion was placed in an oven for 24 hours at 80° C. to modify the nanoparticle surface with the reactive acrylate and non-reactive iC8 functionality from the silanes. The nanodispersion was cooled to room temperature. 330 grams of PM was added to the functionalized nanodispersion. A solvent exchange was performed to remove water using rotary evaporation (Buchi, New Castle, DE) under vacuum at 64° C. The final nanoparticle content of the nanodispersion was adjusted to 45 wt %.

SiO₂ Nanodispersion: PHENYL 75 nm: 400 grams of NALCO 2329K was placed in a 32 ounce glass jar. Agitation was initiated and 450 grams of PM was slowly added. 1.82 grams of PHENYL-TMOS was slowly added. The nanodispersion was agitated for an additional 20 minutes. The nanodispersion was placed in an oven for 24 hours at 80° C. to modify the nanoparticle surface with the reactive acrylate functionality from the silane. The nanodispersion was cooled to room temperature. 330 grams of PM was added to the functionalized nanodispersion. A solvent exchange was performed to remove water using rotary evaporation (Buchi, New Castle, DE) under vacuum at 64° C. The final nanoparticle content of the nanodispersion was adjusted to 45 wt %.

Hardcoat Films

Hardcoat Formulations: HF 1-12: Hardcoat Formulations (HF) for the Examples are shown in Table 2. Multifunctional acrylates (SR344, SR399, SR444c, and SR9035) were placed in a brown glass jar. MEK was added and agitation initiated. The A174 20 nm, A174/METHYL 20 nm, and/or METHYL 20 nm nanodispersion(s) were added and agitation continued until the hardcoat formulation formed a homogenous nanodispersion. ESACURE 1 was dissolved in the hardcoat formulation. PM-1501 was added to the hardcoat formulation and agitation continued for an additional 20 minutes.

TABLE 2

| | Hardcoat formulations HF 1-12 | | | | | | | | | |
|---|---|---|---|---|---|---|---|---|---|---|
| HF | SR399 (g) | SR444c (g) | SR9035 (g) | SR344 (g) | A174 20 nm (g) | A174/METHYL 20 nm (g) | METHYL 20 nm (g) | PM-1501 (g) | ESACURE 1 (g) | MEK (g) |
| 1 | 22.62 | 30.45 | 41.76 | 3.74 | 317.54 | — | — | 0.41 | 3.30 | 280.19 |
| 2 | 22.62 | 30.45 | 41.76 | 3.74 | 238.15 | 79.38 | — | 0.41 | 3.30 | 280.19 |
| 3 | 22.62 | 30.45 | 41.76 | 3.74 | 229.33 | 88.21 | — | 0.41 | 3.30 | 280.19 |
| 4 | 22.62 | 30.45 | 41.76 | 3.74 | 158.77 | 158.77 | — | 0.41 | 3.30 | 280.19 |
| 5 | 22.62 | 30.45 | 41.76 | 3.74 | 141.13 | 176.41 | — | 0.41 | 3.30 | 280.19 |
| 6 | 22.62 | 30.45 | 41.76 | 3.74 | 79.38 | 238.15 | — | 0.41 | 3.30 | 280.19 |
| 7 | 22.62 | 30.45 | 41.76 | 3.74 | 52.92 | 264.61 | — | 0.41 | 3.30 | 280.19 |
| 8 | 22.62 | 30.45 | 41.76 | 3.74 | 31.75 | 285.78 | — | 0.41 | 3.30 | 280.19 |
| 9 | 22.62 | 30.45 | 41.76 | 3.74 | 15.88 | 301.66 | — | 0.41 | 3.30 | 280.19 |
| 10 | 22.62 | 30.45 | 41.76 | 3.74 | 6.35 | 311.19 | — | 0.41 | 3.30 | 280.19 |
| 11 | 22.62 | 30.45 | 41.76 | 3.74 | — | 317.54 | — | 0.41 | 3.30 | 280.19 |
| 12 | 22.62 | 30.45 | 41.76 | 3.74 | — | — | 317.54 | 0.41 | 3.30 | 280.19 |

Comparative Hardcoat Formulation: CHF 1-4: Comparative Hardcoat Formulations (CHF) for Comparative Examples CE 1-CE 4 are shown in Table 3. Acrylate(s) were placed in a brown glass jar. MEK was added and agitation initiated. The surface modified $SiO_2$ nanodispersion(s) was added and agitation continued until the comparative hardcoat formulation formed a homogenous nanodispersion. ESACURE 1 was dissolved in the hardcoat formulation. PM-1501 was added to the hardcoat formulation and agitation continued for an additional 20 minutes.

TABLE 3

Comparative hardcoat formulations CHF 1-4

| CHF | SR444c (g) | E8701 (g) | CN981B88 (g) | A174 20 nm (g) | A174/ CYANO 20 nm (g) | A174 75 nm (g) | PM-1501 (g) | ESACURE 1 (g) | MEK (g) |
|---|---|---|---|---|---|---|---|---|---|
| 1 | — | 111.70 | — | — | 369.70 | — | 0.46 | 3.80 | 214.34 |
| 2 | — | 69.82 | — | — | 161.76 | 318.24 | 0.46 | 3.80 | 145.93 |
| 3 | 192.01 | — | 82.53 | 146.73 | — | — | 0.55 | 4.69 | 273.50 |
| 4 | 128.07 | — | 184.94 | 66.57 | — | — | 0.57 | 4.69 | 315.21 |

Comparative Hardcoat Formulations CHF 5-8: Comparative Hardcoat Formulations (CHF) for Comparative Examples CE 5-8 are shown in Table 4. Multifunctional acrylates (SR344, SR399, SR444c, and SR9035) were placed in a brown glass jar. MEK was added and agitation initiated. The surface modified $SiO_2$ nanodispersions were added and agitation continued until the comparative hardcoat formulation formed a homogenous nanodispersion. ESACURE 1 was dissolved in the hardcoat formulation. PM-1501 was added to the hardcoat formulation and agitation continued for an additional 20 minutes.

TABLE 4

Comparative hardcoat formulations CHF 5-8

| CHF | SR399 (g) | SR444c (g) | SR9035 (g) | SR344 (g) | A174 75 nm (g) | A174/ PHENYL 75 nm (g) | A174/ iC8 75 nm (g) | PHENYL 75 nm (g) | PM-1501 (g) | ESACURE 1 (g) | MEK (g) |
|---|---|---|---|---|---|---|---|---|---|---|---|
| 5 | 11.57 | 44.17 | 44.17 | 3.97 | 104.43 | 209.17 | — | — | 0.41 | 3.33 | 278.78 |
| 6 | 11.57 | 44.17 | 44.17 | 3.97 | 104.43 | — | 209.17 | — | 0.41 | 3.33 | 278.78 |
| 7 | 13.56 | 25.22 | 18.03 | 2.23 | 129.34 | — | — | 283.89 | 0.41 | 3.33 | 223.99 |
| 8 | 13.39 | 24.92 | 17.80 | 2.20 | 274.23 | — | — | 140.64 | 0.41 | 3.33 | 223.08 |

Hardcoat Films: EX 1-12 and CE 1-8: Hardcoat and Comparative Hardcoat Formulations, HF 1-12 and CHF 1-8, were coated onto 3 mil primed PET film in a continuous roll-to-roll process. The hardcoat formulations were metered through a slot die with coating thickness controlled by a metering pump and a mass flow meter. The volatile components of the coating were removed in a 3 zone air floatation oven (zone 1 set to 65.6° C., zone 2 set to 93.3° C., and zone 3 set to 121.1° C.) each zone having a length of approximately 9.1 m. The dried coatings were cured with an in-line 600 W/in Fusion UV curing station with a dichroic reflector using an H bulb source under an inert atmosphere with a temperature controlled back up roll set to a temperature of 48.9° C. The cured hardcoat thickness is shown in Tables 5, 6, and 7.

Hardcoat Films: Optical Characterization

Tables 5 and 6 show optical characterization of the hardcoat films of EX 1-12 and CE 1-8, as well as, details of the hardcoat composition: concentration of each type of nanoparticle, total nanoparticle loading (NP load), resin, and hardcoat thickness. All hardcoat films of EX 1-12 exhibit optical grade quality with high transmission (T) and clarity (C), low haze (H), and low yellowness index (b*). Optical grade quality is essential for front surface display applications. Likewise, the hardcoat films of CE 1-4 which include a urethane acrylate (UA) exhibit optical grade quality. The hardcoat films of CE 5-8 which include the same multifunctional acrylates (MFA) as EX 1-12 exhibit optical grade quality at NP loading of 58 weight percent as shown in CE 5 and CE 6, but high haze at the higher NP loading of 76 weight percent shown in CE 7 and CE 8.

TABLE 5

Optical properties EX 1-12

| EX | HF | A174 20 nm (w %) | A174/ METHYL 20 nm (w %) | METHYL 20 nm (w %) | NP load (w %) | resin[1] | Thickness (um) | T[2] (%) | H[2] (%) | C[2] (%) | b* |
|---|---|---|---|---|---|---|---|---|---|---|---|
| 1 | 1 | 100 | — | — | — | — | 58 | MFA | 5.123 | 94.2 | 0.63 |
| 2 | 2 | 75 | 25 | — | — | — | 58 | MFA | 5.229 | 94.2 | 0.66 |
| 3 | 3 | 72.2 | 27.8 | — | — | — | 58 | MFA | 5.249 | 94.1 | 0.66 |
| 4 | 4 | 50 | 50 | — | — | — | 58 | MFA | 5.171 | 94.2 | 0.67 |
| 5 | 5 | 44.4 | 55.6 | — | — | — | 58 | MFA | 5.167 | 94.2 | 0.68 |
| 6 | 6 | 25 | 75 | — | — | — | 58 | MFA | 5.141 | 94.1 | 0.73 |
| 7 | 7 | 16.7 | 83.3 | — | — | — | 58 | MFA | 5.096 | 94.2 | 0.71 |
| 8 | 8 | 10 | 90 | — | — | — | 58 | MFA | 5.013 | 94.2 | 0.70 |
| 9 | 9 | 5 | 95 | — | — | — | 58 | MFA | 5.070 | 94.1 | 0.70 |
| 10 | 10 | 2 | 98 | — | — | — | 58 | MFA | 5.077 | 94.3 | 0.70 |
| 11 | 11 | — | 100 | — | — | — | 58 | MFA | 5.022 | 91.7 | 0.19 |
| 12 | 12 | — | — | 100 | — | — | 58 | MFA | 5.229 | 94.1 | 0.65 |

[1]MFA: multifunctional acrylate;
[2]T: transmission; H: haze; C: clarity.

TABLE 6

Optical properties CE 1-8

| CE | CHF | A174 20 nm (w %) | A174/ CYANO 20 nm (w %) | A174 75 nm (w %) | A174/ PHENYL 75 nm (w %) | A174/ iC8 75 nm (w %) | PHENYL 75 nm (w %) | NP load (w %) | resin[1] | Thickness (um) | T[2] (%) | H[2] (%) | C[2] (%) | b* |
|---|---|---|---|---|---|---|---|---|---|---|---|---|---|---|
| 1 | 1 | — | — | — | 100 | — | — | 59 | UA | 5.136 | 94.0 | 0.65 | 100.0 | 0.44 |
| 2 | 2 | — | — | — | 35 | 65 | — | 73 | UA | 5.504 | 94.1 | 0.65 | 100.0 | 0.31 |
| 3 | 3 | 100 | — | — | — | — | — | 19 | MFA + UA | 5.100 | 94.2 | 0.65 | 99.9 | 0.27 |
| 4 | 4 | 100 | — | — | — | — | — | 9 | MFA + UA | 5.007 | 94.1 | 0.64 | 99.9 | 0.29 |
| 5 | 5 | — | — | 33 | 67 | — | — | 58 | MFA | 5.311 | 91.8 | 0.33 | 99.4 | 0.45 |
| 6 | 6 | — | — | 33 | — | 67 | — | 58 | MFA | 4.898 | 91.6 | 0.43 | 98.5 | 0.49 |
| 7 | 7 | — | — | 31 | — | — | 69 | 76 | MFA | 5.245 | 91.0 | 28.5 | 97.4 | 1.47 |
| 8 | 8 | — | — | 66 | — | — | 34 | 76 | MFA | 4.925 | 92.2 | 11.1 | 99.1 | 1.02 |

[1]MFA: multifunctional acrylate; UA: urethane acrylate;
[2]T: transmission; H: haze; C: clarity.

Hardcoat Films: Mechanical Characterization

Tables 7 and 8 show mechanical characterization of the hardcoat films of EX 1-12 and CE 1-8, as well as, details of the hardcoat composition: concentration of each type of nanoparticle, total nanoparticle loading (NP load), and resin. EX 1-12 show that a mixture of semi-reactive and reactive nanoparticles is an effective strategy for realizing both hardcoat flexibility and abrasion resistance. EX 1 shows that a nanocomposite hardcoat with all reactive nanoparticles exhibits good abrasion resistance but poor flexibility in tension (mandrel bend, dynamic fold). EX 1 also illustrates a common strategy in the art when abrasion resistance is the primary requirement of the hardcoat on a rigid (non-flexible) surface. EX 12 shows that a nanocomposite hardcoat with all non-reactive nanoparticles exhibits good flexibility but poor abrasion resistance at 1,000 cycles. EX 2-11, which possess both semi-reactive and reactive nanoparticles, illustrate novel nanocomposite hardcoats that exhibit both good flexibility and abrasion resistance that are essential for the next generation of displays. In addition to good flexibility and abrasion resistance, EX 2-11 also exhibit good curl performance.

CE 1-4 use a combination of strategies including the common use of a urethane acrylate to introduce flexibility into the nanocomposite hardcoat. CE 1-4 exhibit good flexibility (mandrel bend, dynamic fold), but poor abrasion resistance. The curl performance of CE 1-4 is good owing to the soft urethane acrylate. CE 5-8 do not include a urethane acrylate, but use multifunctional acrylates. CE 5-8 also include a larger nanoparticle (75 nm), and in CE 7-8, higher nanoparticle loading. The flexibility of CE 5-8 is good owing to the less reactive larger nanoparticle and addition of non-reactive nanoparticle surface modification, but the abrasion resistance is poor relative to EX 1-12. The curl performance of CE 5-8 is also poor.

TABLE 7

Mechanical properties EX 1-12

| EX | HF | A174 20 nm (w %) | A174/ METHYL 20 nm (w %) | METHYL 20 nm (w %) | NP load (w %) | resin[1] | Pencil Hardness @ 1 kg dent | Pencil Hardness @ 1 kg crack | Abrasion Resistance @ 3 kg (cycles) 50 | Abrasion Resistance @ 3 kg (cycles) 500 | Abrasion Resistance @ 3 kg (cycles) 1,000 | Mandrel Bend (mm) tens[2] | Mandrel Bend (mm) comp[2] | Dynamic Fold (cycles) | Curl (mm) |
|---|---|---|---|---|---|---|---|---|---|---|---|---|---|---|---|
| 1  | 1  | 100  | —    | —   | 58 | MFA | 2H | 4H | NS | NS | NS | 6 | 2 | 500     | 5.0 |
| 2  | 2  | 75   | 125  | —   | 58 | MFA | 2H | 4H | NS | NS | NS | 6 | 2 | 10,000  | 4.5 |
| 3  | 3  | 72.2 | 27.8 | —   | 58 | MFA | 2H | 4H | NS | NS | NS | 6 | 2 | 11,833  | 6.5 |
| 4  | 4  | 50   | 50   | —   | 58 | MFA | 2H | 4H | NS | SS | SS | 5 | 2 | 18,333  | 6.5 |
| 5  | 5  | 44.4 | 55.6 | —   | 58 | MFA | 2H | 4H | NS | NS | SS | 5 | 2 | 58,333  | 5.0 |
| 6  | 6  | 25   | 75   | —   | 58 | MFA | 2H | 4H | NS | SS | S  | 5 | 2 | 51,667  | 1.0 |
| 7  | 7  | 16.7 | 83.3 | —   | 58 | MFA | 2H | 4H | NS | NS | S  | 4 | 2 | 38,333  | 1.0 |
| 8  | 8  | 10   | 90   | —   | 58 | MFA | 2H | 4H | NS | NS | NS | 5 | 2 | 45,000  | 0.5 |
| 9  | 9  | 5    | 95   | —   | 58 | MFA | H  | 4H | NS | NS | NS | 5 | 2 | 58,333  | 1.0 |
| 10 | 10 | 2    | 98   | —   | 58 | MFA | H  | 4H | NS | NS | NS | 5 | 2 | 51,667  | 0.5 |
| 11 | 11 | —    | 100  | —   | 58 | MFA | 2H | 4H | NS | NS | SS | 5 | 2 | 51,667  | 0.5 |
| 12 | 12 | —    | —    | 100 | 58 | MFA | H  | 4H | NS | NS | HS | 3 | 2 | >200,000| 0.5 |

[1]MFA: multifunctional acrylate;
[2]tens: tension, comp: compression.

TABLE 8

Mechanical properties of CE 1-8

| CE | CHF | A174 20 nm (w %) | A174/ CYANO 20 nm (w %) | A174 75 nm (w %) | A174/ PHENYL 75 nm (w %) | A174/ iC8 75 nm (w %) | PHENYL 75 nm (w %) | NP load (w %) | Resin |
|---|---|---|---|---|---|---|---|---|---|
| 1 | 1 | —   | 100 | —  | —  | —  | —  | 59 | UA |
| 2 | 2 | —   | 35  | 65 | —  | —  | —  | 73 | UA |
| 3 | 3 | 100 | —   | —  | —  | —  | —  | 19 | MFA + UA |
| 4 | 4 | 100 | —   | —  | —  | —  | —  | 9  | MFA + UA |
| 5 | 5 | —   | —   | 33 | 67 | —  | —  | 58 | MFA |
| 6 | 6 | —   | —   | 33 | —  | 67 | —  | 58 | MFA |
| 7 | 7 | —   | —   | 31 | —  | —  | 69 | 76 | MFA |
| 8 | 8 | —   | —   | 66 | —  | —  | 34 | 76 | MFA |

| CE | Pencil Hardness @ 1 kg dent | Pencil Hardness @ 1 kg crack | Abrasion Resistance @ 3 kg (cycles) 50 | Abrasion Resistance @ 3 kg (cycles) 500 | Abrasion Resistance @ 3 kg (cycles) 1,000 | Mandrel Bend (mm) tens[2] | Mandrel Bend (mm) comp[2] | Dynamic Fold (cycles) | Curl (mm) |
|---|---|---|---|---|---|---|---|---|---|
| 1 | F  | 4H | HS | HS | HS | 2 | 2 | >200,000 | 0.5 |
| 2 | F  | 4H | HS | HS | HS | 3 | 2 | >200,000 | 0.5 |
| 3 | H  | 5H | HS | HS | HS | 3 | 2 | >200,000 | 0.5 |
| 4 | F  | 4H | HS | HS | HS | 2 | 2 | >200,000 | 0.5 |
| 5 | 2H | 4H | NS | HS | HS | 3 | 2 | >200,000 | 2.5 |
| 6 | H  | 5H | HS | HS | HS | 3 | 2 | >200,000 | 3.5 |
| 7 | H  | 4H | S  | HS | HS | 4 | 2 | >200,000 | 15.0 |
| 8 | H  | 4H | HS | HS | HS | 3 | 2 | <1000    | 12.5 |

Test Method

Hardcoat Thickness: Hardcoat thickness was measured using white light interferometry using FTM-ProVis Lite software for analysis.

Transmission, Haze, and Clarity: Optical properties were measured according to ASTM D1003-00 using a Gardner Haze-Guard Plus model 4725 (BYK-Gardner Columbia, MD).

Yellow Index or b*: Yellowness was assessed by measuring b* with a D65 light source. Measurements were taken in transmission on a Konica Minolta Spectrophotometer model CM3700d.

Pencil Hardness: Pencil hardness was measured using the JIS K5600-5-4:1999 test procedure using pencils sourced from Mitsubishi from 6B to 8H hardness and a 1 kg weight. Hardcoat films were inspected visually to determine first visual defect or appearance of any deformation of the substrate under the hardcoat and then using a microscope to determine the pencil at which onset of hardcoat cracking was observed. Reported value is the highest value that the sample passed.

Abrasion: Abrasion was tested using a mechanical device capable of oscillating an abrasive material adhered to a stylus across the hardcoat. The oscillation was performed perpendicular to the coating direction. The stylus oscillated over a 60 mm wide sweep width at a rate of 210 mm/sec (2 wipes/second), where a wipe is defined as a single travel of 60 mm. The stylus was a cylinder with a flat base and a diameter of 3.2 cm. The abrasive material used for this test was steel wool that was obtained from Rhodes-American (a division of Homax Products, Bellingham, WA) under the trade designation "#0000-Super-Fine" and was used as received. Disks of 3.2 cm diameter were cut from the pads and adhered to the base of the stylus using 3M Scotch Permanent Adhesive Transfer tape. The test was performed with a 3.0 kg weight and 50, 500 and 1,000 wipes. After abrasion, the hardcoat was graded for scratch based on a visual standard. NS refers to No Scratch and SS refers to Slight Scratch. Both NS and SS show essentially no change in haze before and after the abrasion test. S refers to Scratch and HS refers to Heavy Scratch, which both show a significant change (>1%) in haze.

Mandrel Bend: Mandrel bend was tested using a modified version of ASTM Method D522/522M-13, "Mandrel Bend Test of Attached Organic Coatings," Test Method B, Cylindrical Mandrel Test. Instead of bending to 90 degrees as specified in the ASTM method, all the samples were wrapped 180 degrees around the mandrel and then evaluated for damage. All samples were tested with the hardcoat on the outside radius (i.e. the hardcoat in tension) and the hardcoat facing the mandrel on the inner radius (i.e. the hardcoat in compression). The minimum cylinder size where no cracking was observed was reported as the minimum bend radius (pass/fail basis).

Dynamic Fold: Dynamic fold was evaluated using a dual pivot dynamic fold tester. The dynamic fold tester has two coplanar plates with parallel pivot axes where both plates can rotate by 90 degrees to face each other with a specified gap in between. The gap between the plates when closed was set to approximately 8 mm. The motor drive was adjusted so that both plates rotate from zero to 90 degrees at the same time. 7.0 inches×1.0 inches pieces of each sample were converted using mechanical cutter and the liners removed. Three replicates of each sample construction were attached to the folding plates coating side down (hardcoat layer in tension) using 1.0" wide strips of a double-sided tape. The tape was applied to the plates such that there was a central free zone approximately 24 mm wide (3 times the gap) wide where the film was unconstrained. The folding rate was set to approximately 30 folds/min and the test run for 300,000 cycles or until all the samples failed. The samples were visually inspected approximately every 1,000 cycles for the first 10,000 cycles and approximately every 5,000-10,000 cycles up to 100,000 folds and then between 10,000 and 25,000 cycles up to 200,000 folds for evidence of failure such as coating cracking, crazing, delamination or haze.

Curl: Curl was measured by placing cutting a 3" by 3" sample of the hardcoat film, with the square being cut so that two of the corners of the film are aligned with the crossweb direction and the two corners of film being aligned with the downweb direction of the film. The 3"×3" samples were placed onto a table top and the edge lift of the corners of the film were measured and the average reported.

Thus, embodiments of FLEXIBLE HARDCOAT are disclosed.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof. The disclosed embodiments are presented for purposes of illustration and not limitation.

What is claimed is:

1. A hardcoat composition comprising:
   one or more multifunctional (meth)acrylate monomers comprising:
       at least one first (meth)acrylate monomers with at least 3 (meth)acrylate groups and alkoxy repeat units; and
       at least one second multi-functional (meth)acrylate monomer that is different from the first monomer; and
   a silica nanoparticle mixture dispersed within the one or more multifunctional (meth)acrylate monomers, the silica nanoparticle mixture comprising:
   75 to 99 wt % of a first population of semi-reactive silica nanoparticles, the semi-reactive silica nanoparticles having a reactive functional group and a non-reactive functional group, the first population of semi-reactive silica nanoparticles have an average particle diameter in a range from 10 nm to 40 nm; and
   25 to 1 wt % of a second population of reactive silica nanoparticles, the second population of reactive silica nanoparticles have an average particle diameter in a range from 10 nm to 40 nm, wherein the hardcoat composition upon curing forms a hardcoat that exhibits no visible scratch after at least 500 scratch cycles when tested for abrasion resistance using a mechanical device with a 3.0 kg weight and capable of oscillating an abrasive material adhered to a stylus across the hardcoat where the oscillation was performed perpendicular to the coating direction, and the stylus was a cylinder with a flat base and a diameter of 3.2 cm, oscillated over a 60 mm wide sweep width at a rate of 210 mm/sec (2 wipes/second), and the abrasive material was steel wool #0000 adhered to the stylus, and exhibits an average curl of less than or equal to 2.0 millimeters when tested for curl by cutting a 7.6 cm×7.6 cm (3 inches×3 inches) sample and permitting the sample to lie flat on a table and measuring the edge lift of the 4 corners of the sample from the table surface and averaging.

2. A hardcoat composition comprising:
   one or more multifunctional (meth)acrylate monomers comprising:
       at least one first (meth)acrylate monomers with at least 3 (meth)acrylate groups and alkoxy repeat units; and
       at least one second multi-functional (meth)acrylate monomer that is different from the first monomer; and
   a silica nanoparticle mixture dispersed within the one or more multifunctional (meth)acrylate monomers, the silica nanoparticle mixture comprising:
   75 to 99 wt % of a first population of semi-reactive silica nanoparticles, the semi-reactive silica nanoparticles having a reactive functional group and a non-reactive functional group, the first population of semi-reactive silica nanoparticles have an average particle diameter in a range from 10 nm to 40 nm;
   the non-reactive functional group formed by a non-reactive surface treatment with a compound having a general formula $R-SiR'_m(OR'')_{3-m}$, wherein R is methyl or ethyl, R' is a $(C_1-C_4)$alkyl, R" is a $(C_1-C_4)$alkyl, m is an integer from 0 to 2; and the reactive functional group formed by a reactive surface treatment with a compound having a general formula X'-L'-SiR'$_m$(OR")$_{3-m}$, wherein X' is a free-radically polymerizable group, L' is an $(C_1-C_{12})$alkylene, R' is a $(C_1-C_4)$alkyl, R" is a $(C_1-C_4)$alkyl, m is an integer from 0 to 2;

25 to 1 wt % of a second population of reactive silica nanoparticles, the second population of reactive silica nanoparticles have an average particle diameter in a range from 10 nm to 40 nm, the reactive silica nanoparticle having a reactive surface treatment with a compound having a general formula X'-L'-SiR'$_m$(OR")$_{3-m}$, wherein X' is a free-radically polymerizable group, L' is an $(C_1-C_{12})$alkylene, R' is a $(C_1-C_4)$alkyl, R" is a $(C_1-C_4)$alkyl, m is an integer from 0 to 2, wherein the hardcoat composition upon curing forms a hardcoat that exhibits no visible scratch after at least 500 scratch cycles when tested for abrasion resistance using a mechanical device with a 3.0 kg weight and capable of oscillating an abrasive material adhered to a stylus across the hardcoat where the oscillation was performed perpendicular to the coating direction, and the stylus was a cylinder with a flat base and a diameter of 3.2 cm, oscillated over a 60 mm wide sweep width at a rate of 210 mm/sec (2 wipes/second), and the abrasive material was steel wool #0000 adhered to the stylus, and exhibits an average curl of less than or equal to 1.0 millimeters when tested for curl by cutting a 7.6 cm×7.6 cm (3 inches×3 inches) sample and permitting the sample to lie flat on a table and measuring the edge lift of the 4 corners of the sample from the table surface and averaging, and the hardcoat does not crack, craze or delaminate after at least 35,000 dynamic folding cycles as tested using a dual pivot dynamic fold tester having two coplanar plates with parallel pivot axes where both plates can rotate by 90 degrees to face each other with a gap of 8 mm, and the motor drive rotated both plates from zero to 90 degrees at the same time at a rate of 30 folds/minute, wherein the samples tested were 3 sets of 7.0 inch×1.0 inch (17.8 cm×2.5 cm) pieces of each sample attached to the folding plates coating side down (hardcoat in tension) using 1.0 inch (2.5 cm) wide strips of a double sided tape.

3. The hardcoat composition according to claim 2, wherein the non-reactive surface treatment for the first population and second population is a compound having a formula R—SiR'$_m$(OR")$_{3-m}$, wherein R is methyl, R' is a $(C_1-C_2)$alkyl, R" is a $(C_1-C_2)$alkyl, and m is an integer from 0 to 2.

4. The hardcoat composition according to claim 2, wherein the non-reactive surface treatment for the first population and second population is a compound having a formula R—SiR'$_m$(OR")$_{3-m}$, wherein R is methyl, m is 0, and R" is a ethyl or methyl.

5. The hardcoat composition according to claim 2, wherein the reactive surface treatment compound has a general formula X'-L'-SiR'$_m$(OR")$_{3-m}$, wherein X' is a (meth)acryl or vinyl group, L' is an $(C_3)$alkylene, m is 0, and R" is a ethyl or methyl.

6. The hardcoat composition according to claim 1, wherein the silica nanoparticle mixture comprises:
99 to 90 wt % of a first population of semi-reactive silica nanoparticles; and
1 to 10 wt % of a second population of reactive silica nanoparticles.

7. The hardcoat composition according to claim 1, wherein the silica nanoparticle mixture comprises:
99 to 95 wt % of a first population of semi-reactive silica nanoparticles; and
1 to 5 wt % of a second population of reactive silica nanoparticles.

8. The hardcoat composition according to claim 1, wherein the semi-reactive silica nanoparticles comprise:
5 to 50 mol % reactive functional groups; and
95 to 50 mol % non-reactive functional groups.

9. The hardcoat composition according to claim 1, wherein the semi-reactive silica nanoparticles comprise:
5 to 30 mol % reactive functional groups; and
95 to 70 mol % non-reactive functional groups.

10. The hardcoat composition according to claim 1, wherein the one or more multifunctional (meth)acrylate monomers form at least 95 wt %, of monomers in the hardcoat composition, and the hardcoat composition contains less than 5 wt %, urethane.

11. The hardcoat composition according to claim 1, wherein the first population of semi-reactive silica nanoparticles have an average particle diameter that is substantially equal to the second population of reactive silica nanoparticles average particle diameter.

12. The hardcoat composition according to claim 1, wherein the silica nanoparticle mixture is present in the hardcoat composition at a loading in a range from 30 to 68 wt % by weight total solids.

13. The hardcoat composition according to claim 1, wherein the silica nanoparticle mixture is present in the hardcoat composition at a loading in a range from 40 to 60 wt % by weight total solids.

14. The hardcoat composition according to claim 1, wherein the first population of semi-reactive silica nanoparticles has an average particle diameter in a range from 10 nm to 30 nm, and the second population of reactive silica nanoparticles has an average particle diameter in a range from 10 nm to 30 nm.

15. A hardcoat comprising a reaction product of the hardcoat composition of claim 1.

16. The hardcoat according to claim 15, wherein the hardcoat has a uniform thickness in a range from 1 to 10 micrometers.

17. A hardcoat film comprising:
a substrate; and
the hardcoat, according to claim 15, disposed on the substrate.

18. The hardcoat film according to claim 17, wherein the substrate is a visible light transparent thermoplastic substrate having a uniform thickness in a range from about 20 to about 350 micrometers.

19. The hardcoat composition according to claim 1, wherein the hardcoat composition upon curing forms a hardcoat that does not crack, craze or delaminate after at least 35,000 dynamic folding cycles as tested using a dual pivot dynamic fold tester having two coplanar plates with parallel pivot axes where both plates can rotate by 90 degrees to face each other with a gap of 8 mm, and the motor drive rotated both plates from zero to 90 degrees at the same time at a rate of 30 folds/minute, wherein the samples tested were 3 sets of 7.0 inch×1.0 inch (17.8 cm×2.5 cm) pieces of each sample attached to the folding plates coating side down (hardcoat in tension) using 1.0 inch (2.5 cm) wide strips of a double sided tape.

* * * * *